US008179495B2

(12) United States Patent
Hsu et al.

(10) Patent No.: US 8,179,495 B2
(45) Date of Patent: May 15, 2012

(54) REPAIR LINE FRAMEWORK OF LIQUID CRYSTAL DISPLAY

(75) Inventors: Sheng-Kai Hsu, Changhua (TW); Chih-Hsiang Yang, Yangmei Township (TW); Po-Yuan Liu, Hsinchu (TW)

(73) Assignee: Au Optronics Corp., Hsin-Chu (TW)

( * ) Notice: Subject to any disclaimer, the term of this patent is extended or adjusted under 35 U.S.C. 154(b) by 409 days.

(21) Appl. No.: 12/318,395

(22) Filed: Dec. 29, 2008

(65) Prior Publication Data

US 2009/0122215 A1 May 14, 2009

Related U.S. Application Data

(63) Continuation of application No. 11/413,198, filed on Apr. 28, 2006, now Pat. No. 7,532,271.

(30) Foreign Application Priority Data

Nov. 14, 2005 (TW) .............................. 94139948 A

(51) Int. Cl.
*G02F 1/1333* (2006.01)
*G02F 1/1343* (2006.01)
*G02F 1/13* (2006.01)

(52) U.S. Cl. ............................ 349/54; 349/55; 349/192

(58) Field of Classification Search ............. 349/54–55, 349/192
See application file for complete search history.

(56) References Cited

U.S. PATENT DOCUMENTS

| | | | | |
|---|---|---|---|---|
| 5,729,309 | A | 3/1998 | Na et al. | |
| 5,859,679 | A | 1/1999 | Song et al. | |
| 6,111,558 | A * | 8/2000 | Jeung et al. | 345/93 |
| 6,525,705 | B1 * | 2/2003 | Ishii et al. | 345/87 |
| 6,819,370 | B2 | 11/2004 | Sah et al. | |
| 7,027,043 | B2 * | 4/2006 | Sakaki | 345/206 |
| 7,394,508 | B2 * | 7/2008 | Chen et al. | 349/54 |
| 2002/0030656 | A1 * | 3/2002 | Goto et al. | 345/89 |
| 2004/0012727 | A1 | 1/2004 | Kim et al. | |
| 2004/0075800 | A1 | 4/2004 | Sah et al. | |
| 2005/0162581 | A1 * | 7/2005 | Lim et al. | 349/54 |
| 2005/0263772 | A1 * | 12/2005 | Park | 257/72 |

* cited by examiner

*Primary Examiner* — Mark Robinson
*Assistant Examiner* — Charles Chang
(74) *Attorney, Agent, or Firm* — Rabin & Berdo., P.C.

(57) ABSTRACT

A repair line framework of liquid crystal display is provided. By disposing part of the repair line inside the integrated circuit chip so that the routing of part of the repair line will penetrate through the integrated circuit chip before returning to the panel, or by routing part of the repair line disposed on the substrate within the display region so that the routing is positioned under the black matrix of the color filter, the routing length of the repair line is shortened and the impedance of the repair line is reduced.

14 Claims, 6 Drawing Sheets

REPAIR LINE FRAMEWORK OF LIQUID CRYSTAL DISPLAY

This application is a continuation of application Ser. No. 11/413,198 filed on Apr. 28, 2006, now pending, which claims the benefit of Taiwan application Serial No. 94139948, filed Nov. 14, 2005, the subject matter of which are incorporated herein by reference.

BACKGROUND OF THE INVENTION

1. Field of the Invention

The present invention relates in general to a liquid crystal display, and more particularly, to a repair line framework of liquid crystal display panel.

2. Description of the Related Art

The liquid crystal display panel has a lower substrate made from a glass. The lower substrate has a plurality of pixel circuits, a plurality of scan lines and a plurality of data lines formed thereon. Each pixel receives a corresponding control signal (that is, a scan signal and a pixel voltage) via a corresponding scan line and a corresponding data line to display an image. That is, the scan lines, the data lines and the pixel circuits form a display region on the lower substrate.

Besides, the lower substrate has a plurality of repair lines disposed thereon. The repair lines are also called "rescue lines". Part of the repair lines is formed on the lower substrate and crossed over the scan lines and the data lines are used as a substitute circuit when open circuit occurs to the above scan lines or the data lines. That is, the control signal is transmitted to the corresponding pixel via one of the repair lines. However, when the development of the liquid crystal display panel is headed towards large-scaled products, such as large-scaled liquid crystal TV, the routing path of the repair line will increase accordingly. When the routing length of the repair line increases, the control signal will have higher impedance when transmitted to the repair line. In terms of large-scaled liquid crystal display panels, how to reduce signal attenuation of the repair line and maintain the manufacturing cost of the liquid crystal apparatus have become an imminent challenge to the panel industry.

SUMMARY OF THE INVENTION

It is therefore an object of the present invention to provide a repair line framework of liquid crystal display capable of reducing costs and enhancing image quality by effectively reducing the impedance of the repair line as well as the area of the substrate.

The present invention achieves the above-identified object by providing a liquid crystal display. The liquid crystal display includes a display panel, at least one internal repair line, at least one repair line and at least one integrated circuit chip. The display panel has a plurality of signal lines. The at least one internal repair line is formed on the display panel and crossed over the signal lines. Part of the repair line is disposed on the display panel and crossed over the signal lines. The at least one integrated circuit chip is disposed on the at least one repair line and is electrically connected to the signal lines. The at least one repair line includes at least one first portion and at least one second portion. The at least one first portion is disposed inside the at least one integrated circuit chip. The at least one second portion is formed on the display panel and crossed over the signal lines.

Other objects, features, and advantages of the present invention will become apparent from the following detailed description of the preferred but non-limiting embodiments. The following description is made with reference to the accompanying drawings.

DETAILED DESCRIPTION OF THE INVENTION

The present invention provides a repair line framework of liquid crystal display. By disposing part of the repair line inside the integrated circuit chip so that the routing of the part of the repair line will penetrate through the integrated circuit chip before returning to the panel, or by routing the part of the repair line disposed on the substrate to be within the display region so that the routing is positioned under the black matrix of the color filter, the routing length of the repair line will be shortened and the impedance of the repair line will be reduced. Within, the substrate can be made from glass, plastic, ceramic, or like as. The repair line is disposed underneath the black matrix, avoiding the aperture ratio being too low due to routing and keeping the repair line unnoticeable to naked eyes. According to the above practice, the routing of the repair line positioned on an edge of the display panel is reduced and so is the impedance of the repair line. For example, the parasitic capacitance and the resistance are reduced, so that the signal attenuation on the repair line is reduced and that the image quality is enhanced.

First Embodiment

Figure 1A:
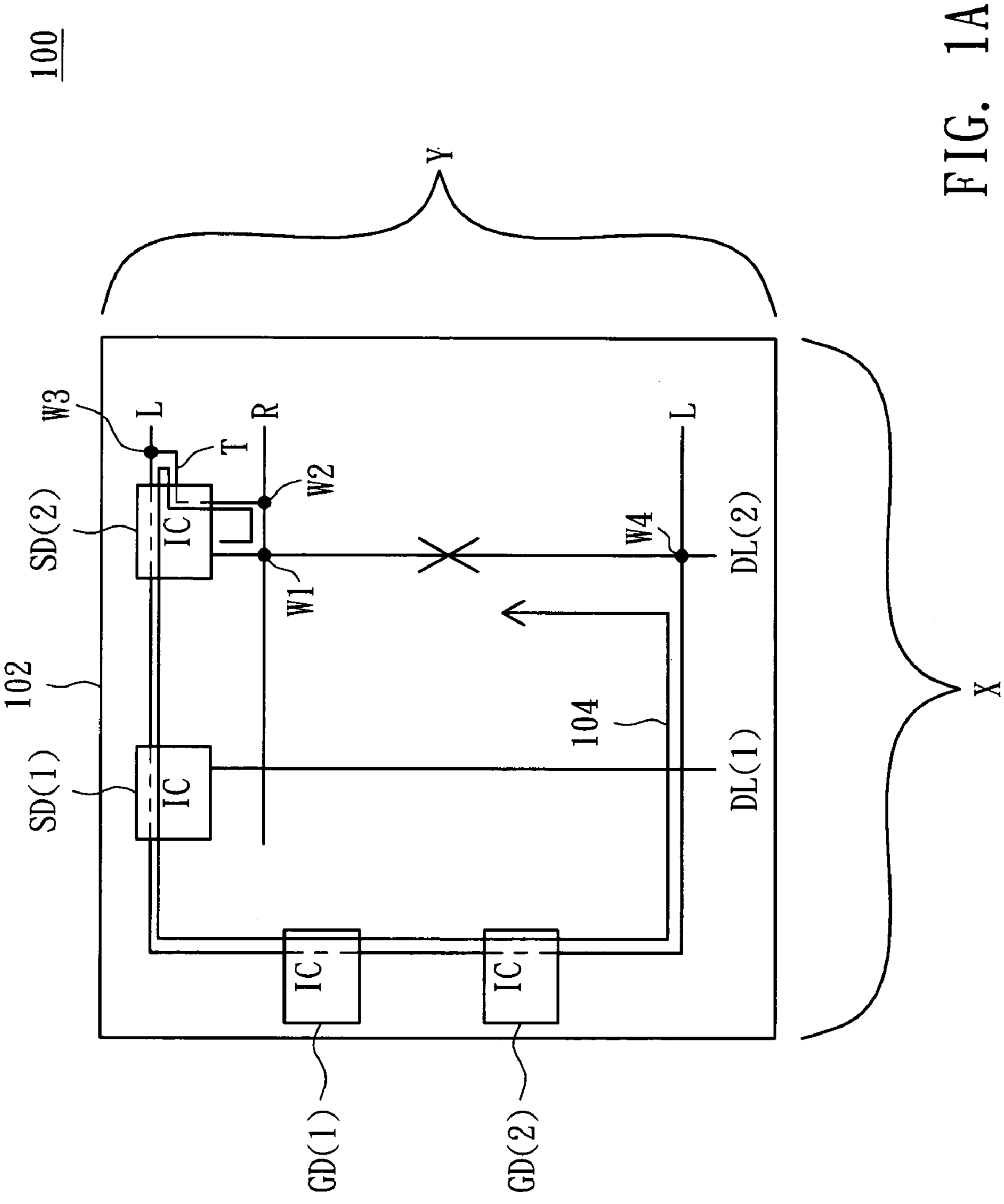
FIG. 1A illustrates an example of a repair line framework of liquid crystal display according to a first embodiment of the present invention.

Referring to FIG. 1A, an example of a repair line framework of liquid crystal display according to a first embodiment of the present invention is shown. The liquid crystal display 100 includes a plurality of integrated circuit chips (IC), a display panel 102 and at least one repair line L. The at least one repair line L may be referred to as an "external repair line." In the present embodiment of the invention, the integrated circuit chips (IC) are disposed on the display panel 102 according to the chip on glass (COG) technology, and are exemplified by two data driving circuits SD(1) and SD(2) and two scan driving circuits GD(1) and GD(2). The display panel 102 includes a plurality of signal lines, at least one internal repair line R and at least one connection line T. The signal lines including a scan line and a data line are denoted by two data lines DL(1) and DL(2) in FIG. 1A. The data lines DL(1) and DL(2) are respectively and electrically connected to their corresponding data driving circuits SD(1) and SD(2). The internal repair line R is formed on the display panel 102 and crosses over the signal lines DL(1) and DL(2) to be selectively and electrically connected to the signal lines DL(1) and DL(2) by laser welding. Part of the connection line T is also formed on the display panel 102 and crosses over the repair line L and the internal repair line R to be selectively and electrically connected to the repair line L and the internal repair line R by laser welding. It is noted that the connection line T can be completely routed on the display panel 102, or the part of the connection line T can be routed on the display panel 102 and routed inside the integrated circuit chips (IC). In FIG. 1A, the part of the connection line T is routed inside the integrated circuit chips (IC) (denoted by dotted line) and routed on the display panel crossing over the repair line L and the internal repair line R. Nevertheless, the routing must cross over the repair line L and the internal repair line R. In addition, at least one of the integrated circuit chips has at least one buffer serially connected to the repair line L for reducing signal delay on the repair line L.

The repair line L is composed of at least two portions. The first portion is disposed inside the integrated circuit chips (IC) (denoted by dotted line in FIG. 1A), that is, inside two data driving circuits SD(1) and SD(2) and two scan driving circuits GD(1) and GD(2). The second portion (denoted by solid line in FIG. 1A) is formed on the display panel 102 and crossed over the signal line DL(1) and one side of the signal line DL(2), that is, close to the underneath of the display panel 102. Thus, when the signal line DL (2) is disconnected, the other side of the signal line D(2) is electrically connected to the internal repair line R to form a welding point W1, the connection line T is electrically connected to the internal repair line R and the repair line L by laser welding to form welding points W2 and W3, and the other side of the signal line DL (2) is electrically connected to the repair line L by laser welding to form a welding point W4. Thus, the welding points W1~W4 form a path 104 enabling the signals transmitted on the signal line D(2) such as pixel voltage to be transmitted to the pixels on the other side of the signal line D(2) through the path 104.

Figure 1B:
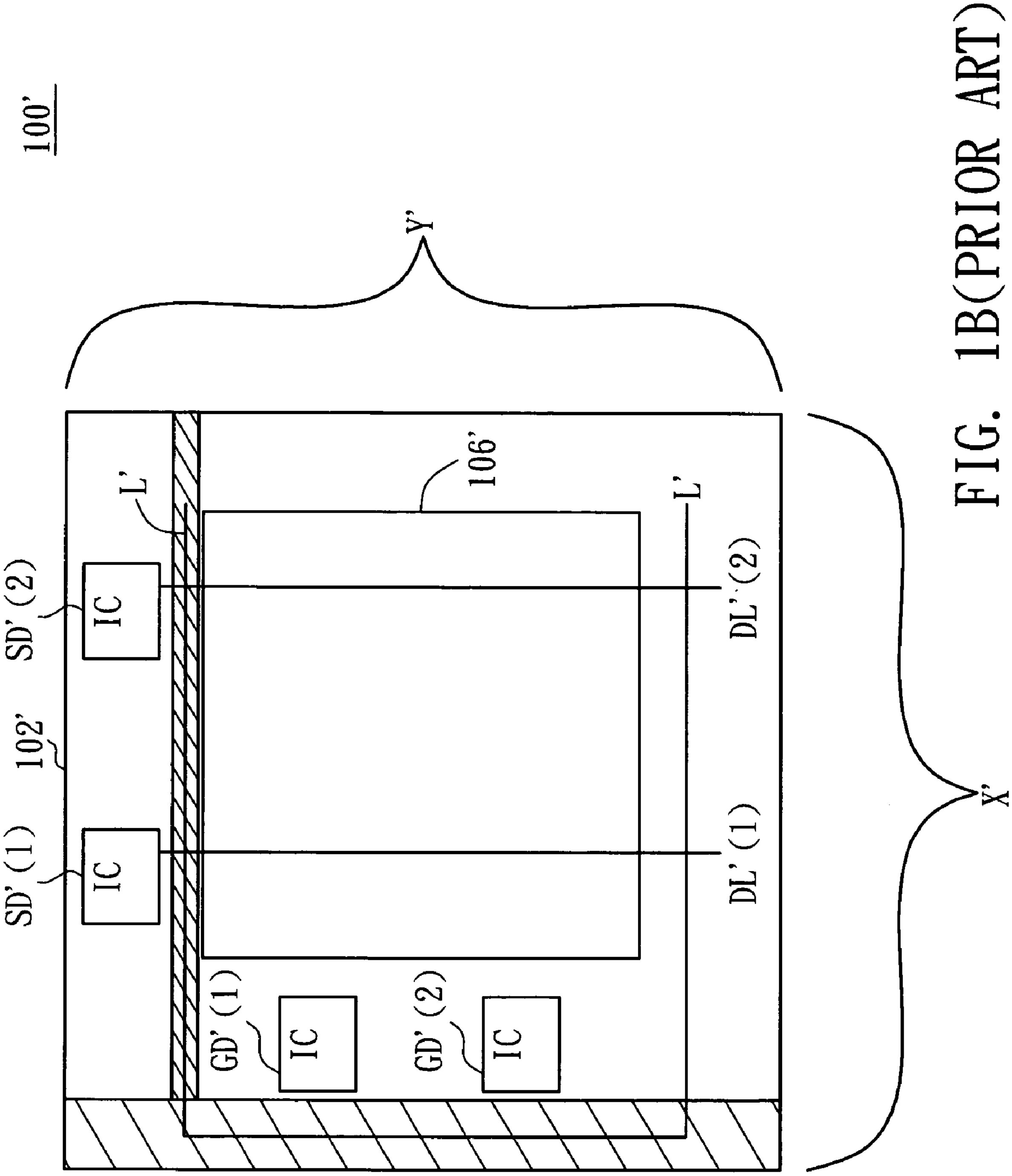
FIG. 1B(PRIOR ART)
FIG. 1B illustrates a conventional repair line framework.

Compared with conventional method which completely routes the repair line on the display panel 102, the method disclosed above reduces the area of the repair line routed on the edge of the display panel 102 as well as the impedance of the repair line (that is, the resistance of the parasitic capacitance and the repair line), hence improving the image quality of display. Referring to FIG. 1B, a conventional repair line framework is shown. The part of the conventional repair line L' routed outside the display region 106 is routed to the left of the scan driving circuits GD'(1) and GD'(2) and routed above or below the data driving circuit SD'(1) and SD'(2). Therefore, when more and more repair lines are disposed, the area of the substrate 102' (the slant area in FIG. 1B) will be increased. While in FIG. 1A, the present embodiment of the invention disposes the part of the repair line L inside the integrated circuit chips (IC) to reduce the area of the edges of the display panel 102. That is to say, the length X and length Y marked in FIG. 1A will be smaller than the length X' and the length Y' marked in FIG. 1B. Despite the area of the display region being same, the display panel 102 will have a smaller area, thus reducing the manufacturing costs. Due to the manufacturing process of the glass, the conventional repair line L' completely formed on the display panel 102' will have a parasitic capacitance and a resistance much larger than the parasitic capacitance and the resistance on the repair line L of the present embodiment of the invention. Consequently, the signals transmitted on the repair line L' will have a severer attenuation than the signals transmitted on the repair line L. Compared with the liquid crystal display of the present embodiment of the invention, the conventional liquid crystal display 100' has worse image quality and higher manufacturing costs.

Figure 2A:
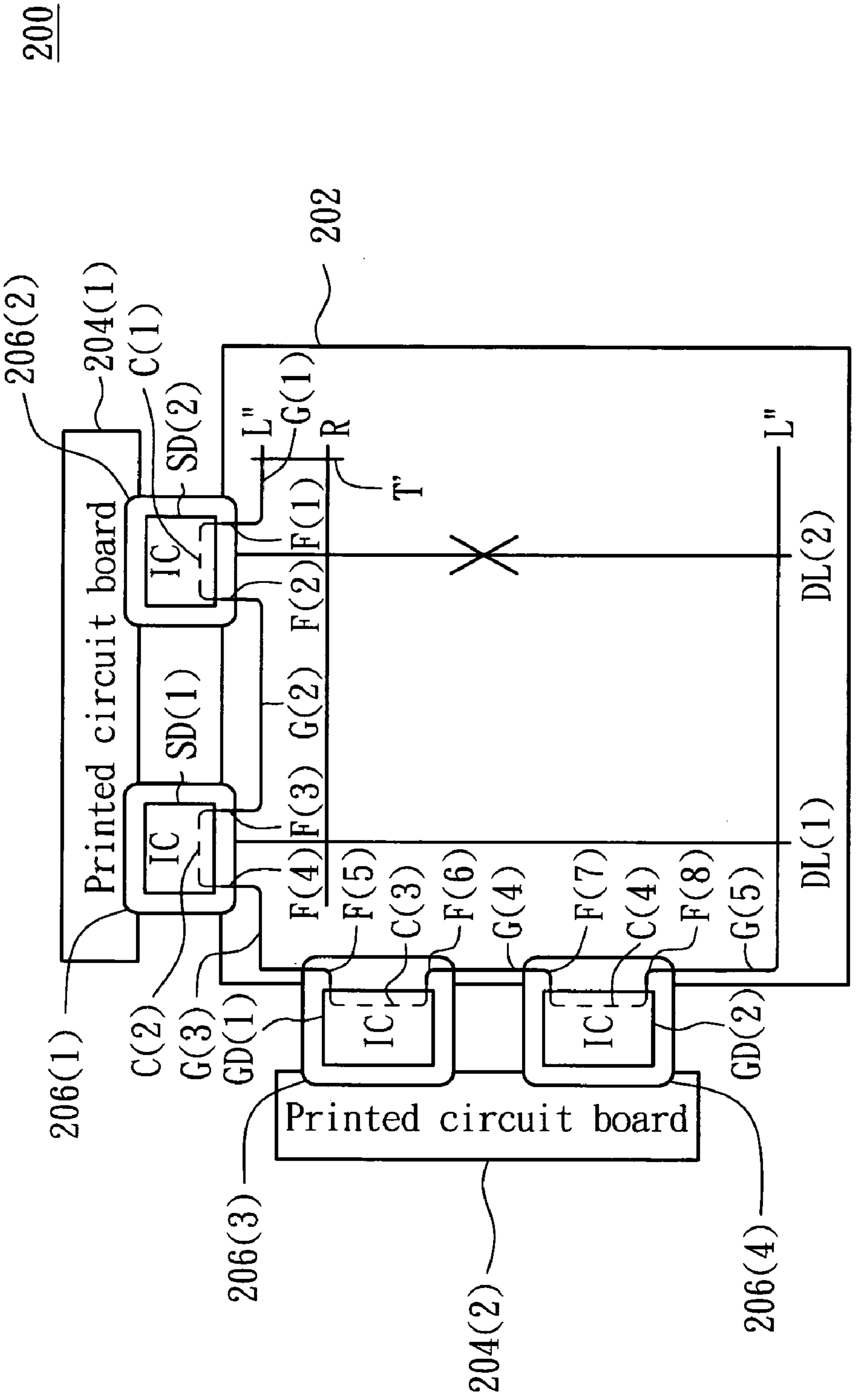
FIG. 2A illustrates another example of the repair line framework according to the first embodiment of the present invention.

Referring to FIG. 2A, another example of the repair line framework according to the first embodiment of the present invention is shown. The liquid crystal display 200 is exemplified by including at least one repair line L", a display panel 202, two printed circuit boards 204(1) and 204(2), four flexible circuit boards 206(1), 206(2), 206(3) and 206(4), and four integrated circuit chips. The four integrated circuit chips (IC) can be disposed on corresponding flexible circuit board 206 according to the tape carrier package (TCP) technology or the chip on film (COF) technology. The four integrated circuit chip (IC) include two data driving circuits SD(1) and SD(2) and two scan driving circuits GD(1) and GD(2). The display panel 202 (the lower substrate) includes two signal lines DL(1) and DL(2), at least one connection line T', and at least one internal repair line R.

The repair line L" is composed of three portions according to the position of routing. The first portion G(1)~G(5) is formed on the display panel 202 (the lower substrate). The second portion F(1)-F(8) is disposed on the flexible circuit board 206. The third portion C(1)~C(4) is disposed on the integrated circuit chip (IC). Since the second portion F(1)~F(8) and the third portion C(1)~C(4) of the repair line L" are an ordinary metal conductive wire instead of being formed on the display panel 202 according to the glass manufacturing process, the total impedance of the repair line L" can be largely decreased, hence mitigating the attenuation of signals. As shown in FIG. 1A, compared with the conventional repair line which is completely routed on the display panel 102', the liquid crystal display 200 reduces the area of the repair line routed on the edge of the display panel 202.

The repair line framework shown in FIG. 2A differs with the repair line framework shown in FIG. 1A in the disposition of the integrated circuit chip (IC). Both FIG. 1A which adopts the COG technology and FIG. 2A which adopts the TCP or the COF technology reduce the impedance of routing by reducing the routing length of the repair line disposed on the substrate. Therefore, the present embodiment of the invention does not impose any restriction regarding the disposition of the integrated circuit chip (IC), and any disposition disposing the part of the repair line inside the integrated circuit chips (IC) to reduce the routing length of the repair line on the substrate will do.

Figure 2B:
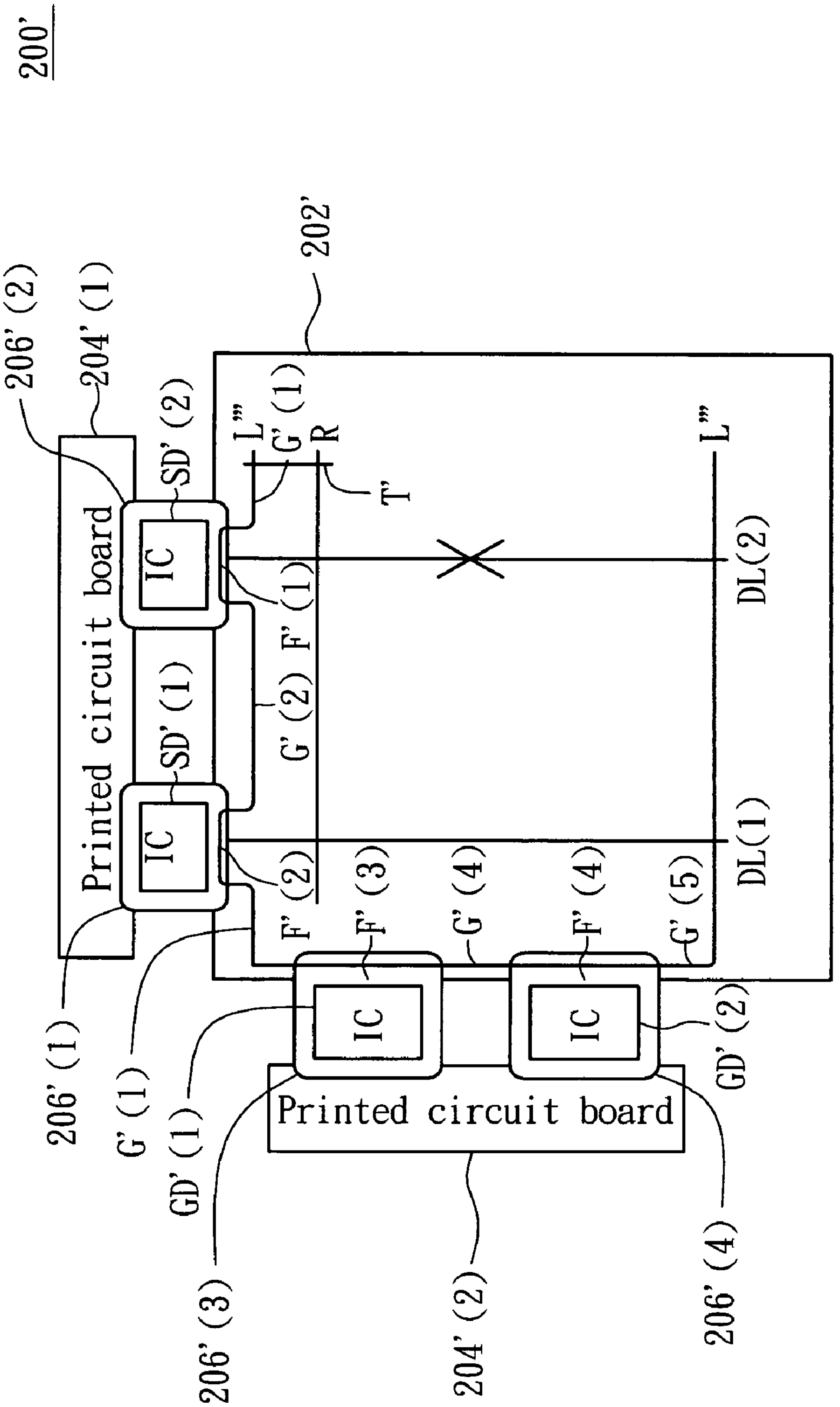
FIG. 2B illustrates a second example of the repair line framework according to the first embodiment of the present invention.
Figure 2C:
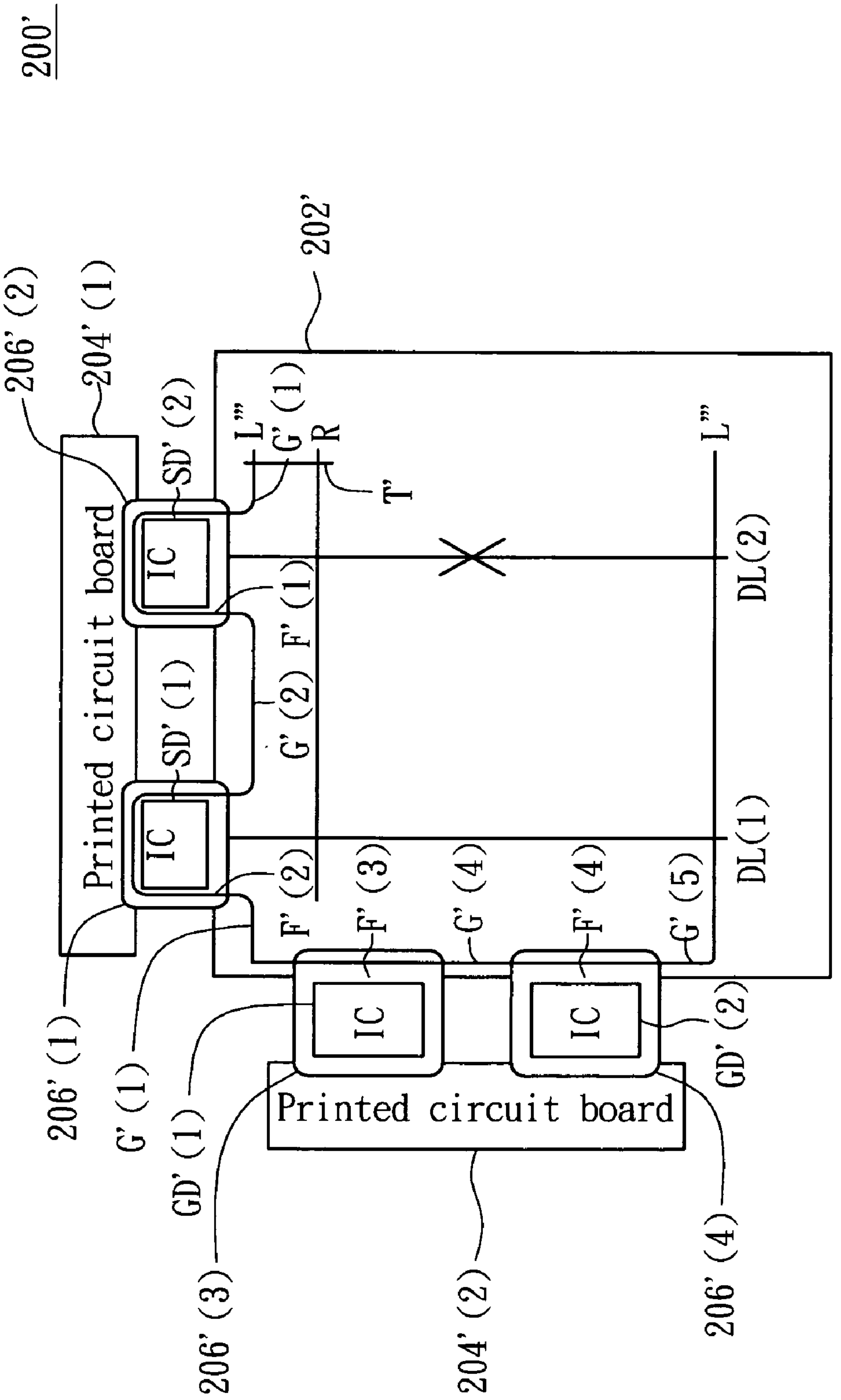
FIG. 2C illustrates a third example of the repair line framework according to the first embodiment of the present invention.

Besides, the repair line can be disposed on the aforementioned flexible circuit board so that the routing length of the repair line on the substrate can be reduced. Referring to FIG. 2B, a second example of the repair line framework according to the first embodiment of the present invention is shown. The liquid crystal display 200' has the same framework with the framework disclosed above. It is noted that the repair line L'" is composed of two portions according to the position of routing. The first portion G'(1)~G'(5) is formed on the substrate 202'. The second portion F'(1)~F'(4) is respectively formed on the flexible circuit boards 206(1)~206(4) to reduce the impedance of routing as well as the area of the display panel 202'. Or, referring to FIG. 2C, a third example of the repair line framework according to the first embodiment of the present invention is shown. The second portion F'(1)~F'(4) can be formed on the flexible circuit board 206(1)~206(4) by surrounding the integrated circuit chips SD'(1) and SD'(2).

Second Embodiment

Apart from disposing the repair line inside the integrated circuit chips (IC) to reduce the routing length of the repair line disposed on the substrate, the part of the repair line can be routed within the display region to reduce the routing length of the repair line, further reducing the impedance of the repair line and the required area of panel and improving the image quality of display.

Figure 3:
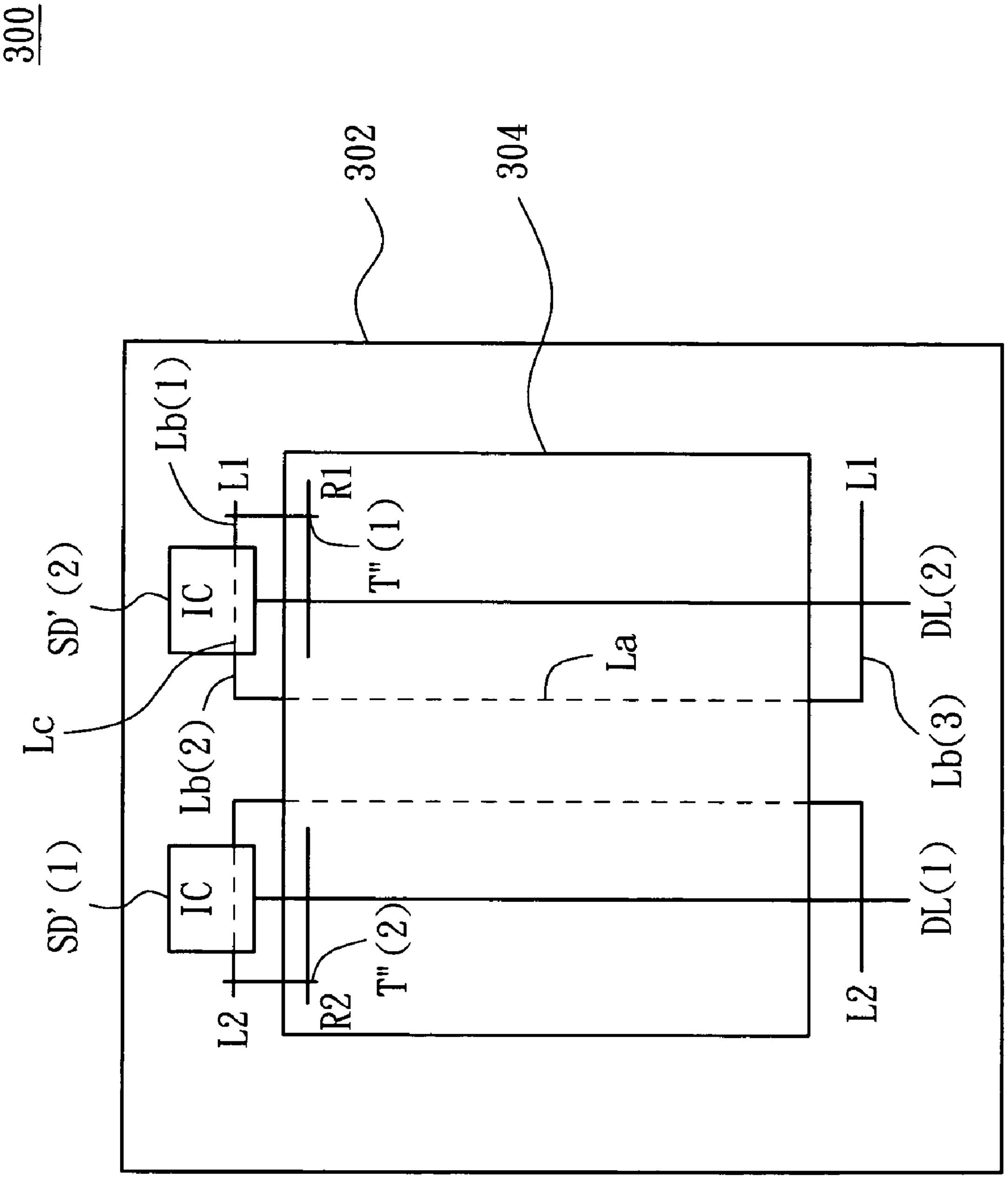
FIG. 3 illustrates a repair line framework of liquid crystal display according to a second embodiment of the present invention.

Referring to FIG. 3, a repair line framework of liquid crystal display according to a second embodiment of the present invention is shown. The liquid crystal display 300 is exemplified by including two repair lines L1 and L2, a plurality of integrated circuit chips (IC) and a display panel 302. The display panel 302 (the lower substrate) includes a plurality of signal lines, at least two internal repair lines R1 and R2 and two connection lines T"(1) and T"(2). In the present embodiment of the invention, a plurality of integrated circuit chips (IC) disposed on the display panel 302 according to the COG technology are exemplified by two data driving circuit SD(1) and SD(2). Examples of the signal lines include two data lines DL(1) and DL(2). The data lines DL(1) and DL(2) are respectively and electrically connected to their corresponding data driving circuits SD(1) and SD(2). The internal repair lines R1 and R2 are formed on the display panel 302 and crossed over the signal lines DL(1) and DL(2). The connection line T"(1) is formed on the display panel 302 and crossed over the repair line L1 and the internal repair line R1. The connection line T"(2) is also formed on the display panel 302 and crossed over the repair line L2 and the internal repair line R2.

Since the repair line L1 and the repair line L2 have symmetric structure, only the repair line L1 is used for exemplification. The repair line L1 is composed of three portions according to the position of routing. The first portion La is formed on the display region and within the display panel 302. The second portion Lb(1), Lb(2) and Lb(3) is formed on the display panel 302 and outside the display region. The third portion Lc is disposed on the integrated circuit chip (IC). It is noted that the first portion La of the repair line L1 is formed within the display region and routed underneath the black matrix. The color filter includes the black matrix. The liquid crystal display 300 further includes the color filter (the color filter and the black matrix thereof are not shown in FIG. 3). By routing the first portion La under the black matrix, the original image quality is not affected but the length of the repair line L1 is largely reduced. Therefore, the routing length of the repair line L1 is shortened, so that the impedance of the repair line is reduced and that signal attenuation is mitigated. The mitigation of signal attenuation means the image quality is improved.

In addition, according to the present embodiment of the invention, the integrated circuit chips (IC) (that is, the data driving circuits SD(1) and SD(2)) are fixed on the display panel 202 according to the COG technology. However, the integrated circuit chips (IC) can further be disposed at an edge of the display panel 202 according to the COF technology or the TCP technology. The routing of the repair line L1 or L2 can further be disposed on the flexible circuit board or inside the integrated circuit chips (IC) like the framework disclosed in the first embodiment to further reduce the impedance of the repair line L1.

To summarize, the present embodiment of the invention allows the part of the repair line to be routed within the display region to shorten the routing length of the repair line and reduce the impedance of the repair line. Consequently, the attenuation of the pixel voltage or the pixel current transmitted through the repair line is mitigated, and the area of the display panel is effectively reduced.

According to the repair line framework of liquid crystal display disclosed in the above embodiments of the present invention, by disposing the part of the repair line inside the integrated circuit chip or by routing the part of the repair line disposed on the substrate within the display region, the routing length of the repair line is shortened, so that the area of the repair line the routing positioned on the edge of the display panel as well as the impedance of the repair line are reduced.

While the present invention has been described by way of example and in terms of a preferred embodiment, it is to be understood that the present invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display, comprising:

a display panel having an outer edge and having a plurality of signal lines, the signal lines comprising a plurality of data lines and a plurality of scan lines;

an external repair line consisting of a first part and a second part;

a plurality of flexible circuit boards each having a first end and a second end and being disposed at said outer edge of the display panel, wherein the first end of each of the flexible circuit boards is electrically connected to one or more of the signal lines; and at least one other circuit board electrically connected to the second end of each of the flexible circuit boards, wherein said first part is disposed on the display panel at said outer edge thereof and crosses over the data lines, and said second part is disposed only on each of the flexible circuit boards, and the external repair line is connected to one of the flexible circuit boards via another of the flexible circuit boards.

2. The display of claim 1, further comprising:

a plurality of integrated circuit chips disposed on the flexible circuit boards, electrically connected to the signal lines.

3. The display of claim 1, further comprising:

an internal repair line formed on the display panel, the internal repair line crossing over and being selectively and electrically connected to one or more of the data lines; and a connection line formed on the display panel, the connection line crossing over and being selectively and electrically connected to the internal repair line and the external repair line.

4. The display of claim 2, wherein at least one of the integrated circuit chips comprises a data driving circuit.

5. The display of claim 2, wherein at least one of the integrated circuit chips comprises a scan driving circuit.

6. The display of claim 2, further comprising:

at least one buffer serially connected to the external repair line for reducing a signal delay of a signal on the external repair line.

7. The display of claim 6, wherein the at least one buffer is disposed inside at least one of the integrated circuit chips.

8. The display of claim 1, further comprising:

a color filter corresponding to the display panel, wherein the color filter has a black matrix, and a portion of the external repair line that is disposed on the display panel is routed underneath the black matrix.

9. The display of claim 3, further including a closed electrical loop consisting of the external repair line, the internal repair line, the connection line and one of the data lines.

10. The display of claim 1, wherein the external repair line intersects the data lines at a plurality of intersection areas, the data lines and the flexible circuit boards connect to each other at a plurality of connection areas, wherein said outer edge includes a first edge and a second edge opposite the first edge, one of the connection areas is disposed at the first edge, and one of the intersection areas, being closest to said connection area at the first edge than any of the other intersection areas, is disposed on the second edge.

11. A liquid crystal display, comprising:

a display panel having an outer edge and having a plurality of signal lines, the signal lines comprising a plurality of data lines and a plurality of scan lines;

an external repair line consisting of a first part and a second part;

a plurality of flexible circuit boards each having a first end and a second end and disposed at said outer edge of the display panel, wherein the first end of each of the flexible circuit boards is electrically connected to one or more of the signal lines; and an other circuit board electrically connected to the second end of each of the flexible circuit boards, wherein said first part is disposed on the display panel at said outer edge thereof and crosses over the data lines, and said second part is disposed only on each of the flexible circuit boards, and the external repair line is not disposed on the other circuit board.

12. The display of claim 11, further comprising:

an internal repair line formed on the display panel, the internal repair line crossing over and being selectively and electrically connected to one or more of the data lines; and a connection line formed on the display panel and crossing over and being selectively and electrically connected to the external repair line and the internal repair line.

13. The display of claim 12, further including a closed electrical loop consisting of the external repair line, the internal repair line, the connection line and one of the data lines.

14. The display of claim 11, wherein the external repair line intersects the data lines at a plurality of intersection areas, the data lines and the flexible circuit boards connect to each other at a plurality of connection areas, wherein said outer edge includes a first edge and a second edge opposite the first edge, one of the connection areas is disposed at the first edge, and one of the intersection areas, being closest to said connection area at the first edge than any of the other intersection areas, is disposed on the second edge.

* * * * *